June 28, 1966

G. J. OROZCO 3,257,870

MEASURING AND TEST APPARATUS INCLUDING INDEXING MECHANISM

Filed July 30, 1962

INVENTOR.
Gilbert J. Orozco

BY

ATTORNEY

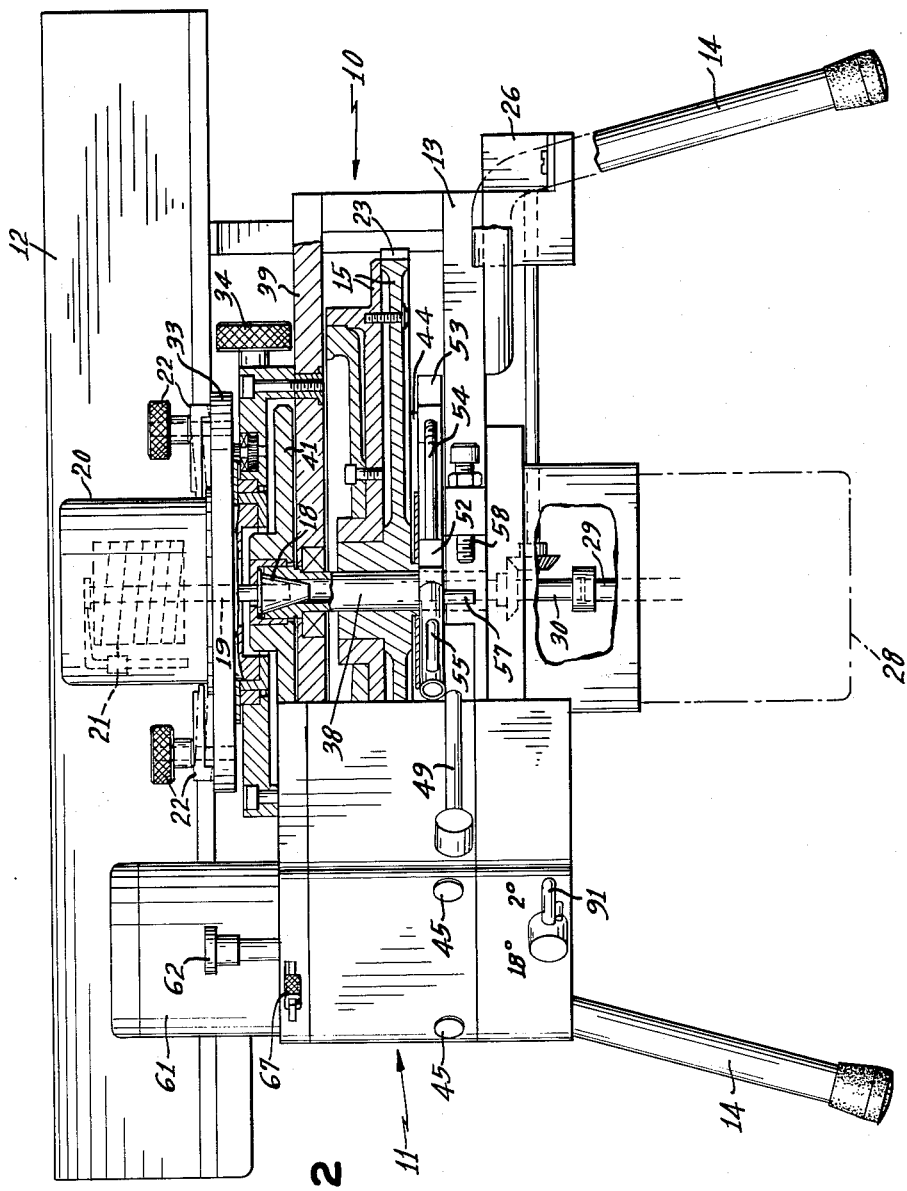

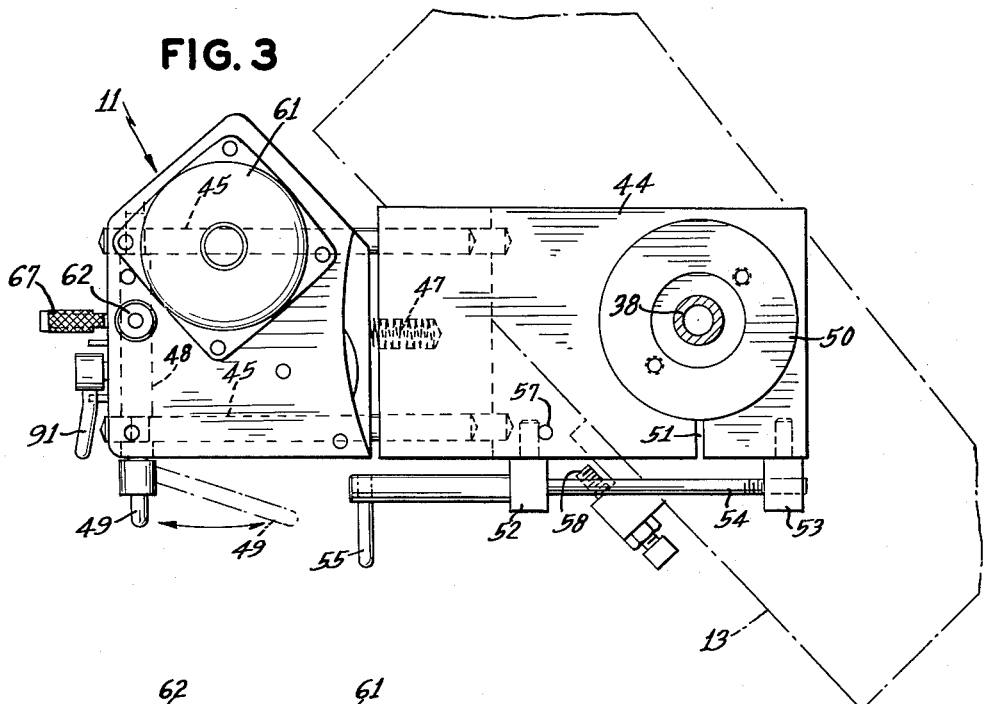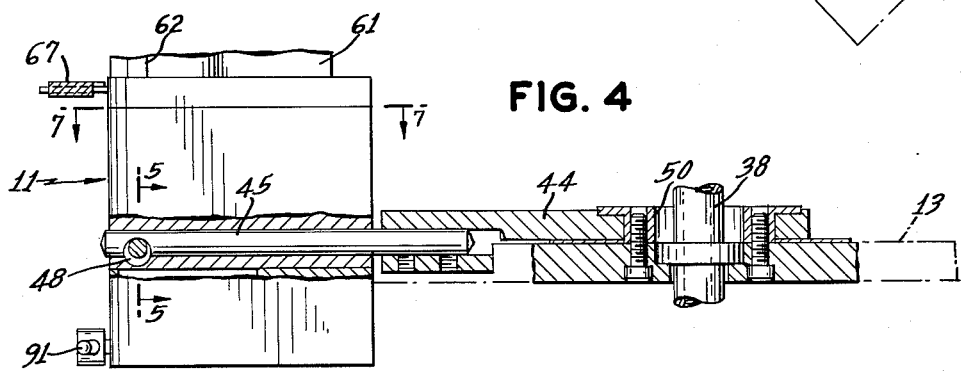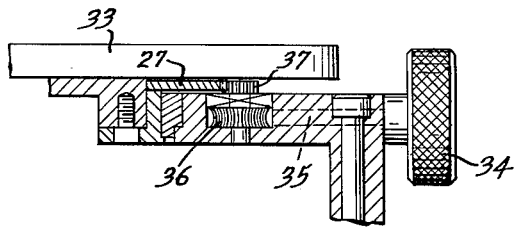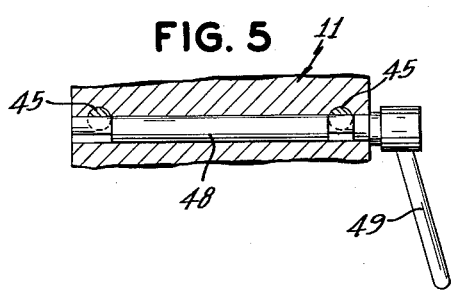

June 28, 1966 G. J. OROZCO 3,257,870
MEASURING AND TEST APPARATUS INCLUDING INDEXING MECHANISM
Filed July 30, 1962 6 Sheets-Sheet 4

INVENTOR.
Gilbert J. Orozco
BY
ATTORNEY

June 28, 1966 G. J. OROZCO 3,257,870
MEASURING AND TEST APPARATUS INCLUDING INDEXING MECHANISM
Filed July 30, 1962 6 Sheets-Sheet 5
FIG. 10
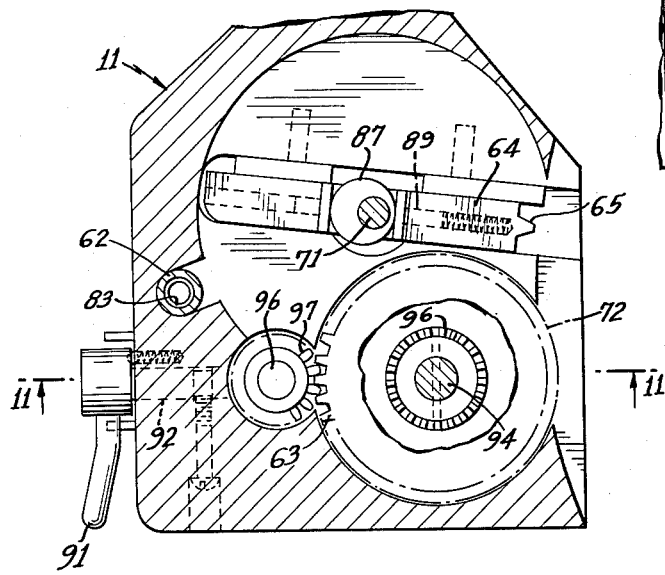
FIG. 12
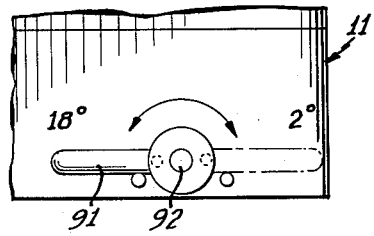
FIG. 14
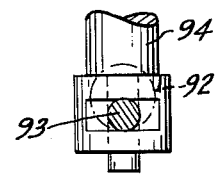
FIG. 13
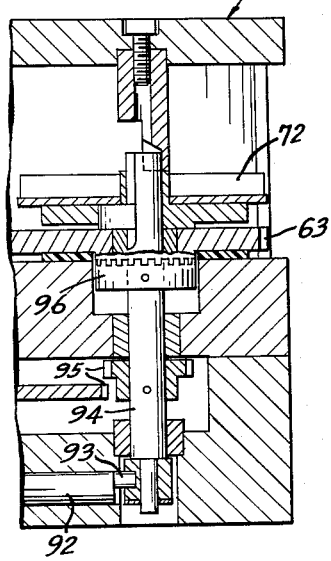
FIG. 11
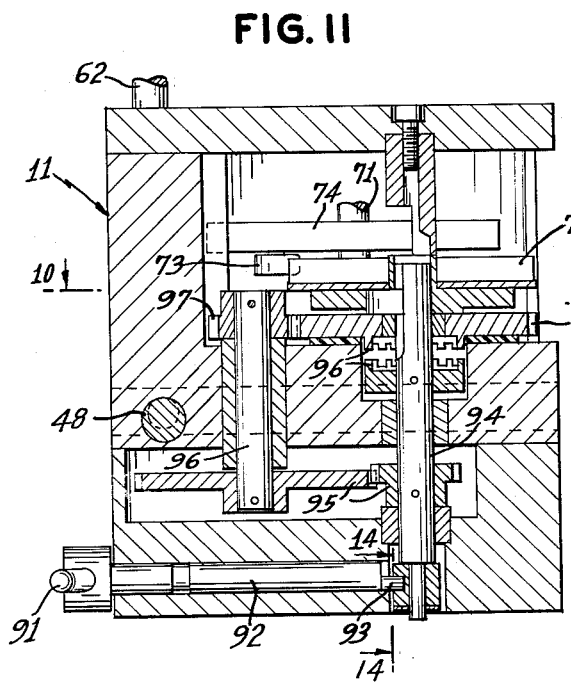
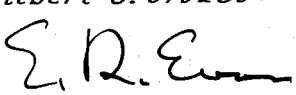
INVENTOR.
Gilbert J. Orozco
BY
ATTORNEY June 28, 1966   G. J. OROZCO   3,257,870
MEASURING AND TEST APPARATUS INCLUDING INDEXING MECHANISM
Filed July 30, 1962   6 Sheets-Sheet 6
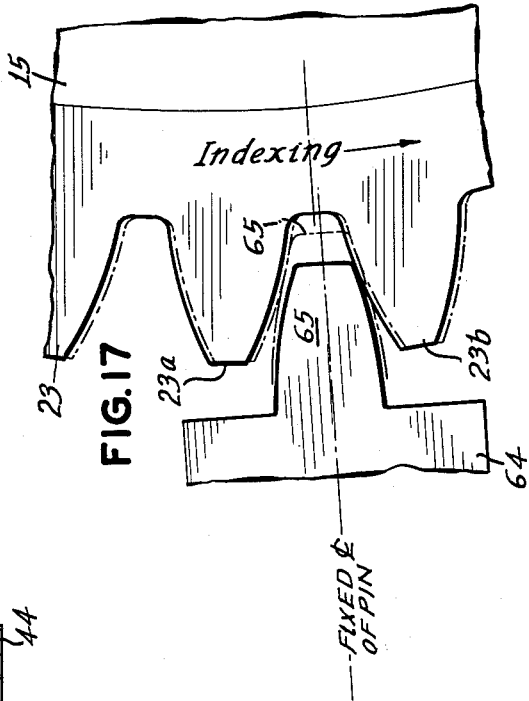
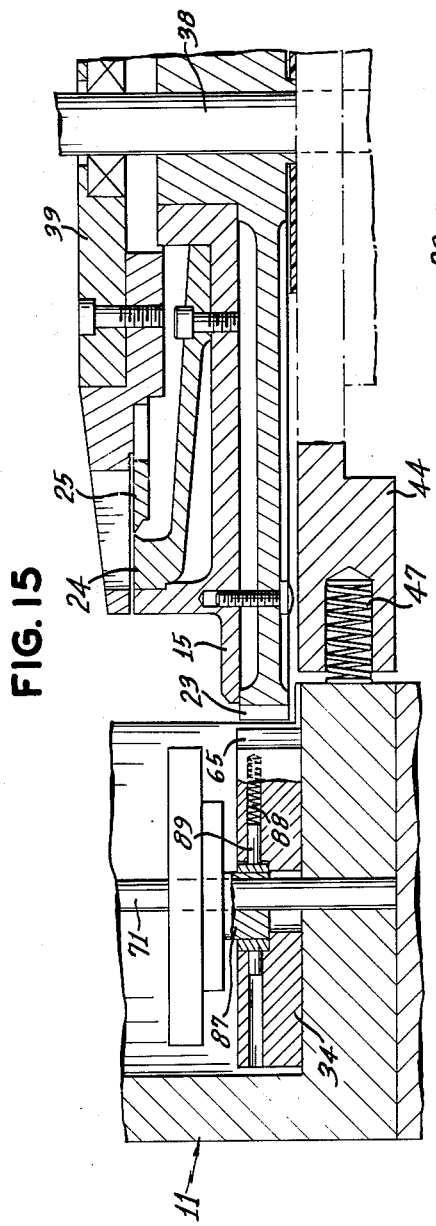
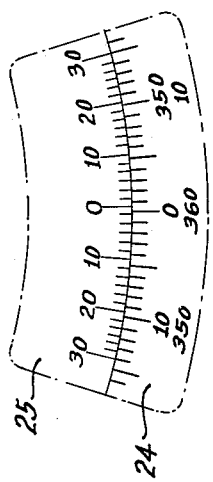
INVENTOR.
Gilbert J. Orozco
BY
ATTORNEY

United States Patent Office 3,257,870
Patented June 28, 1966

3,257,870
MEASURING AND TEST APPARATUS INCLUDING
INDEXING MECHANISM
Gilbert J. Orozco, New Rochelle, N.Y., assignor to Litton
Industries, Inc., Beverly Hills, Calif.
Filed July 30, 1962, Ser. No. 213,280
8 Claims. (Cl. 74—815)

This invention relates generally to precision rotary positioning mechanism, and to testing apparatus employing such positioning mechanism for testing potentiometers and similar devices.

Single or multiturn potentiometers are used in many electrical systems, for example, servo systems, where the relation between the incremental movement of the contact slider and the change in resistance across the output terminals must be held within close tolerances to predetermined values. This requirement presents a difficult problem in testing the units for compliance with the stringent specifications covering such applications. It is impractical to adjust the control shaft attached to the contact manually, particularly in the case of small miniaturized units, because of the precise measurements required.

A further difficulty in measuring the angle v. resistance characteristic is caused by the friction between the contact slider and the surface of the resistance element. In potentiometers of the type referred to, the flexibility of the contact introduces an error in the measurement if the control shaft is moved beyond the precise angular position where a reading is to be taken, and then reversed in direction to return the shaft to the desired position. Thus the control shaft must always be advanced, step-by-step, and stopped exactly at each predetermined angular position for recording the resistance changes or the deviation from the resistance of a "master" potentiometer.

Accordingly, it is an object of the present invention to alleviate these difficulties by an improved mechanism capable of advancing the shaft or other device which is to be positioned, exactly to the desired angular positions.

Another object of the invention is to provide a simplified rotary positioning or indexing mechanism for angularly positioning an element with a high degree of precision and which is easy to set up and operate.

Another object of the invention is to eliminate all angular error in an indexing mechanism, except that due to inaccurate machining of the indexing plate, by a novel drive system, and if desired provide the same provision in both clockwise and counter-clockwise rotation.

A still further object of the invention is to provide an indexing mechanism of the motor-driven type which can be cycled through successive steps by an operator, and which can be readily adjusted as to the initial position of the device to be indexed in relation to the indexing plate, the size of the steps in the movement, and so forth, to achieve maximum flexibility of operation.

According to the invention, a rotatable index plate is releasably clamped to the shaft of the potentiometer under test, so that the shaft is turned when the index plate rotates. Obviously, the indexing mechanism may also be used for other purposes, i.e., to adjust any object or work piece which is to be moved to a desired position or work station. A phasing adjustment is provided to adjust the "start" or initial position of the potentiometer shaft in relation to the zero adjustment of the index plate. The index plate may be similar to the conventional type having a circular periphery formed with notches or teeth adapted to engage the teeth of a drive gear or pinion. In the indexing mechanisms of the prior art, however, the drive pinion advances the index plate slightly beyond the desired angular position and is then retracted from driving relation with the index plate, and an index pin or similar cam member is employed to return the index plate to the desired position, in order to eliminate the error resulting from backlash in the drive.

In order to index the plate and connected shaft without reverse movement, in accordance with the invention, the drive pinion is precisely rotated during each cycle to turn the index plate to a point short of the desired position, preferably by a small fraction of a degree. The teeth of the pinion and index plate are formed to provide a predetermined amount of backlash, thus permitting an indexing pin or cam to advance the index plate exactly to the desired angular position without removing the pinion from the position in mesh with teeth of index plate. This construction has the further advantage that the precise adjustment obtained works equally well in either direction of rotation of the index plate, since the backlash in effect reverses with reversal of the direction of drive by the drive pinion.

In the preferred embodiment of the invention, the drive pinion is rotated by a reversible electric motor connected through an intermittent-motion drive, including a Geneva gear, and a change-speed gear which is operative to vary the extent of rotation of the pinion as desired. A trip button is provided to enable the operator to release the motor shaft for a single revolution, to shift the index plate from one angular position to the next. During the dwell in the motor drive, after the drive pinion has turned the index plate, a cam driven by the electric motor projects an indexing pin or cam into engagement with the index plate, and thereby advances the plate to the exact angular position desired. For simplicity the indexing pin is arranged to engage the peripheral teeth on the index plate but obviously other camming means may be employed to effect the final angular index adjustment.

A feature of the invention relates to an indexing mechanism which is particularly adapted for use with test gear for precision potentiometers. Instruments of this kind impose special requirements on the test gear which are satisfactorily met with equipment embodying this invention.

The invention is not restricted to specific indexing mechanism per se, and a feature of the invention relates to the combination and coordination with other parts of the complete machine, providing enhanced accuracy and flexible control without requiring a highly skilled operator.

A further feature of the invention relates to indexing mechanism for a work piece or control shaft to be positioned, comprising a rotatable index plate provided with peripheral teeth, a drive gear engaging the teeth on said plate for cyclically turning the plate approximately to the desired indexing positions, the meshing teeth having a predetermined amount of backlash, and camming means for advancing the index plate to the exact index positions, with brake means or the equivalent for preventing overtravel of the index plate.

For a better understanding of the invention, and of further features and advantages thereof, reference is made to the following detailed description of a typical embodiment shown in the accompanying drawings, wherein FIG. 1 is a plan view of a test apparatus constructed according to the invention;

FIG. 2 is a front elevational view of the apparatus shown in FIG. 1;

FIG. 3 is a plan view of the pivoted support for the drive unit;

FIG. 4 is a side view, partly in section, of the subassembly of FIG. 3;

FIG. 5 is a sectional view taken on line 5—5 of FIG. 4;

FIG. 6 is a detail view of the phase adjusting control for the potentiometer mounting plate;

FIG. 10 is a cross-sectional view of the motor drive unit taken on the line 10—10 of FIG. 11;

FIG. 11 is a vertical cross-section taken on the line 11—11 of FIG. 10, showing the variable-ratio drive construction;

FIGS. 12, 13 and 14 are detail views of the subassembly shown in FIGS. 10 and 11;

FIGS. 15 is a detail view, partly in section, showing the relation between the index plate and motor-driven indexing pin or cam;

FIG. 16 illustrates the vernier scale arrangement; and

FIG. 17 is a fragmentary view of an enlarged scale of the indexing pin, showing the preferred relation to the index plate.

The measuring and testing apparatus of the present invention includes novel indexing mechanism which is of general utility in a variety of machines. As shown in the accompanying drawings, the indexing mechanism is illustrated as a component part of apparatus for measuring or testing precision potentiometers or the like.

Figure 1:
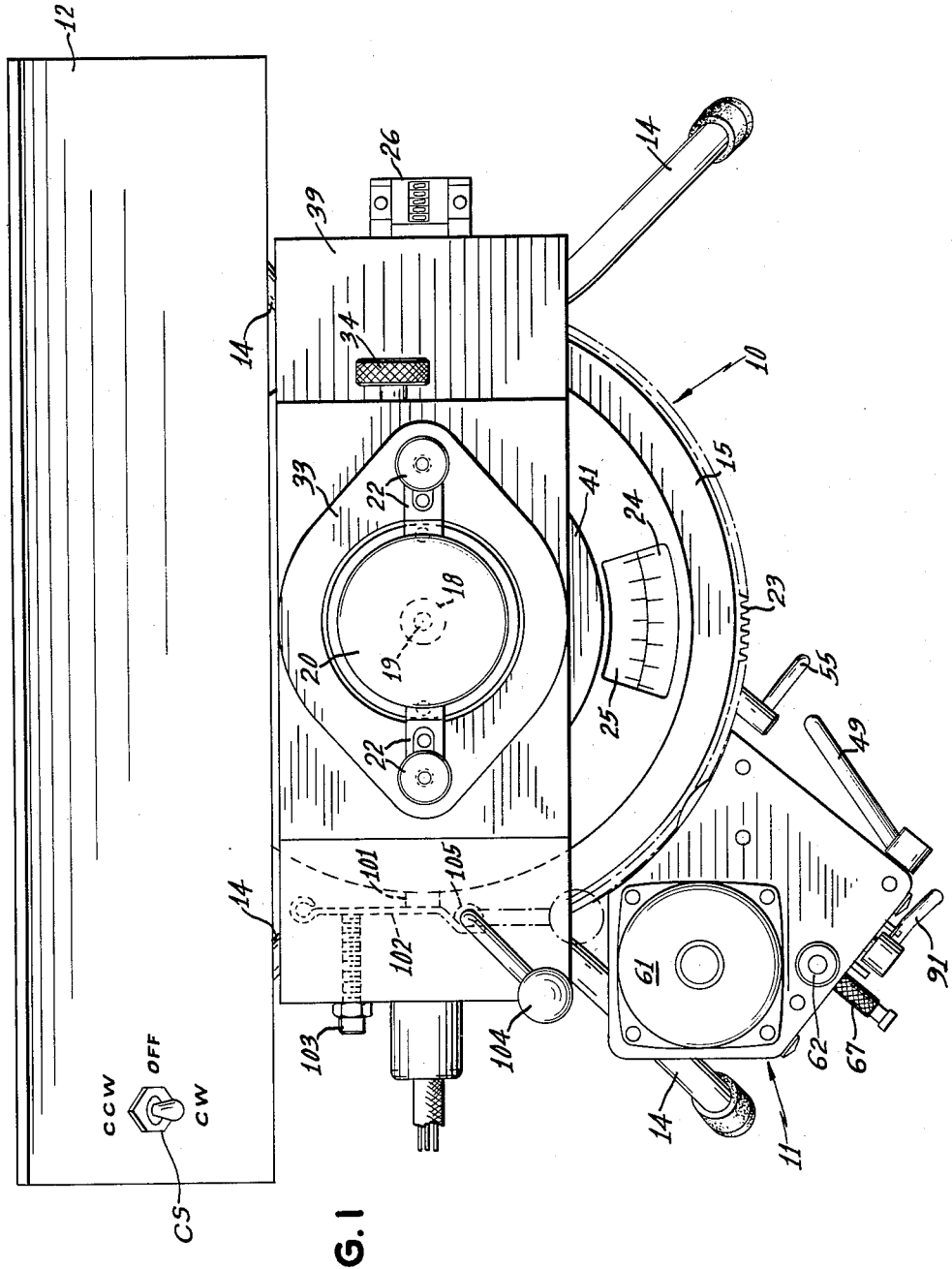

Referring to the drawings, the testing apparatus illustrated comprises two major assemblies, an indexing assembly 10 and a motor drive unit 11 for the indexing assembly. A terminal panel 12 is also illustrated in FIGS. 1 and 2, said panel for example being equipped with a motor control switch CS, output terminals, etc., forming no part of the present invention.

The indexing mechanism 10 includes a frame comprising a bed plate 13 mounted on supporting legs 14 or in any other suitable manner and carrying a rotatable index plate 15. While the index plate 15 can be used for positioning various elements with a high degree of precision to angularly spaced stations or positions, as shown the plate is provided with clamping means in the form of an expansible chuck 18 (FIG. 2) for gripping the control shaft 19 of a potentiometer 20. In this manner the shaft of the potentiometer is releasably clamped to the index plate so that the operation of the indexing mechanism may be employed to accurately position the control shaft 19 of the potentiometer with its connected contact slider 21 in a series of successive angular positions for the purpose of testing the resistance v. angle characteristic of the potentiometer. The potentiometer 20 is held in position in any suitable manner, as by manually operable clamping members 22.

The index plate 15 is of circular shape and formed with a circumferential series of notches or gear teeth 23 around its periphery. Thus the plate may include a standard gear with involute gear teeth, the profiles and equal spacing of the gear teeth being formed with the highest precision possible to attain with the best machine shop practice available. The number of teeth will vary with the character of the indexing operation and any suitable number may be employed as will be apparent to those skilled in the art. Where equal spacing of the indexing positions is desired, it is convenient to use a number of teeth which is an even fraction of the 360-degree circumference, namely 90 or 180 teeth for example. The teeth 23 on the index plate 15 are specially formed, as will be explained below, in order to cooperate in the desired manner with the drive gear and indexing cam of the motor drive unit 11.

For the convenience of the operator, a 360-degree scale 24 attached to the index plate 15 and a fixed vernier scale 25 are provided to indicate to the operator the angular position of the index plate. A counter 26 (FIGS. 1 and 2) may also be provided to indicate the number of revolutions of the index plate. If a master or reference potentiometer is used to compare with the readings from the potentiometer under test, such a potentiometer 28 may be mounted below the bed plate 13 with its control shaft 29 clamped to a shaft 30 that turns with the index plate 15. Thus the contact sliders of the master potentiometer and the potentiometer under test are rotated in unison as the index plate 15 rotates.

In order to bring the contact elements of the potentiometers 20 and 28 into exact phase, before starting the test and measurement procedure, phase adjustment means is provided to shift the angular position of the potentiometer mounting plate 33 with respect to the rotatable index assembly 10. The adjustment means, as shown, comprises a phase adjusting knob 34 (FIGS. 2 and 6) on a journalled shaft 35 carrying a worm adapted to turn a worm gear 36. A pinion 37 on the shaft of the gear 36 engages a spur gear 27 secured to the underside of the mounting plate 33, which is gradually turned around the axis of the index assembly as the phasing knob 34 is turned by the operator.

The index assembly includes a central sleeve 38 journalled in the base plate 13 (FIG. 2) and extending upward through the index plate 15 and through a horizontal bracket 39 on which the phase adjustment means 34 and the potentiometer mounting plate 33 are mounted. The sleeve or pivot 38 also carries at its upper end the releasable chuck 18. A rotatable hand wheel 41, adapted to be turned manually to close or release the chuck 18, is journalled on the upper end of the sleeve 38.

The motor drive unit 11, as more clearly shown in FIGS. 3 and 4, is attached to a pivoted supporting plate 44, carried by the base plate 13 of the indexing assembly and provided with parallel bars 45 extending through holes bored through the casing of the drive unit. The drive unit 11 is held in position on the supporting plate 44 against the pressure of the coiled spring 47 by any suitable means, such as the rotatable cam member 48 (FIG. 5) engaging transverse notches in the bars 45. An operating lever 49 is attached to the member 48. The supporting plate 44 is pivoted about the axis of the indexing assembly, and as shown a sleeve 50 fixed to the base plate 13 forms a journal for the plate 44 and motor drive unit 11. In order to lock the drive unit in the adjusted position, the plate 44 may be slotted as indicated at 51, and suitable clamping means such as the posts 52, 53, a threaded rod 54 and a lever or knob 55 on the rod may be used to pinch the journal sleeve 50, and thus lock the plate 44 in its adjusted position on said sleeve. A lug or pin 57 on the plate 44 and an adjustable stop member 58 on the base plate 13 serve to limit the angular adjustment of the motor drive unit.

*Indexing operation*

Figure 9:
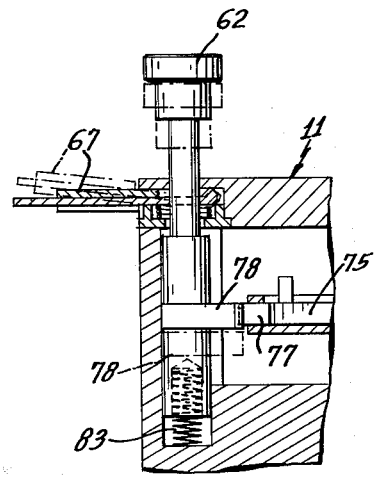
FIG. 9 is a detail view of the trip button assembly.

In accoradnce with the invention, the motor drive unit 11 is designed and constructed to turn the index plate 15 in successive steps precisely to desired angular positions, without reverse movement, to enable successive measurements to be made on the potentiometer 20 under test. Referring to FIGS. 1, 2, 10 and 15, the drive unit 11 comprises four principal elements—a reversible electrical motor 61, a trip button 62, a drive gear 63 connected to the motor and adapted to drive the index plate 15 in either the clockwise or counterclockwise direction, and a reciprocable indexing pin or cam member 64 provided with a tip portion 65 for fine adjustment of the index plate. The first drive shaft of the unit, connected to the motor 61, makes one revolution for each cyclic operation of the indexing mechanism. Normally depressing the trip button 62 releases said shaft for one revolution; however means such as the trip latch 67 (FIGS. 1 and 9) engaging the stem of the trip button may be provided to lock the trip button down for continuous cyclic operation.

The basic principle of the indexing operation involves: (a) providing a predetermined amount of backlash between the teeth on the drive gear 63 and the index plate 15, respectively; (b) turning the drive gear accurately during each cycle to advance the index plate approximately to, but not beyond, the desired index position; and (c) advancing the index plate exactly to the desired index position. A friction brake may be employed to prevent overtravel of the index plate. Thus assuming the index plate 15 is provided with 180 teeth 23 and the plate is to be advanced one tooth (2 degrees) during each cycle, the drive gear 63 is turned by an intermittent drive mechanism to advance the index plate one tooth less a small fraction, or say 1.9 degrees. FIG. 17 illustrates the positions of the two teeth 23a and 23b opposite the indexing tip 65 during the dwell in the rotation of the drive gear. As the indexing pin 64 is projected, by means to be described, the tip 65 engages the rear face of tooth 23b and advances the index plate 15 to the position shown in dotted lines, which is the desired index position. The drive gear 63 can be mounted on a fixed axis, which is desirable in obtaining the utmost accuracy in the driving relation, since the fine adjustment of the index plate by the index pin 64 is permitted by the blacklash in either direction of rotation of the index plate 15.

*Detailed construction of drive unit*

Figure 7:
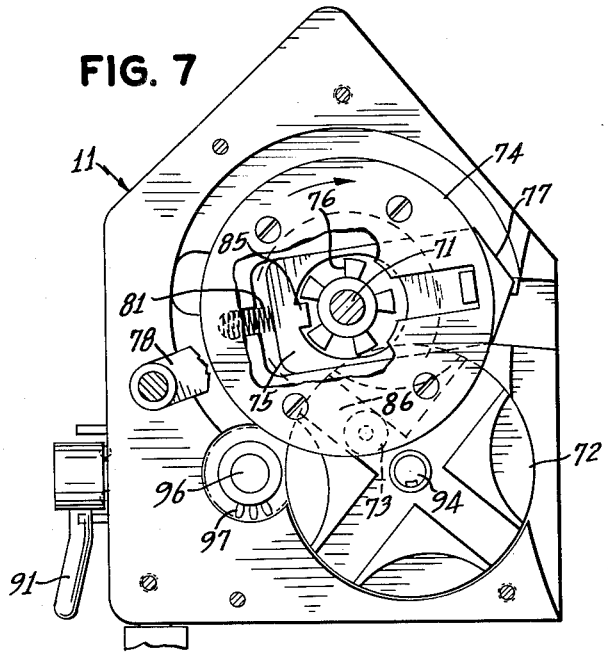
FIGS. 7 and 8 are cross-sectional views of the motor drive unit, showing the clutch and drive gear mechanism before and after the commencement of the indexing cycle, taken on line 7—7 of FIG. 4.
Figure 8:
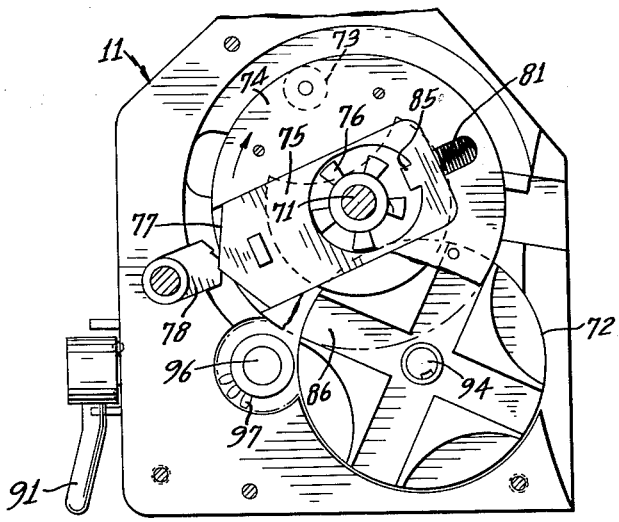

Referring to FIGS. 7–15, a preferred construction of drive unit 11 is shown by way of example, in which a single drive motor 61 operates both the drive gear 63 and the indexing cam 65 in properly timed relation, and the angular movement of the index plate 15 during each cycle may be altered to meet different test requirements. The drive shaft 71 connected to the motor, which is designated the "first" shaft, is in turn connected to a Geneva gear consisting of the slotted disc 72 and drive pin 73 (FIGS. 7 and 8) rotated by a supporting disc member 74 driven by the first shaft 71. Before the trip button 62 is depressed, the drive elements are stationary (see FIG. 8), since the clutch plate 75 is disengaged from the toothed drive collar 76. The clutch plate 75 has a projecting tip 77 engaging the latch lug 78 mounted on the stem of the trip button 62. The clutch plate 75 is mounted for lengthwise movement and is biased by a spring 81 towards the left (as shown in FIG. 8). When the trip button 62 is depressed against the coil spring 83 which tends to hold the button in the raised position, the latch member 78 is moved below the tip 77 (see FIG. 9), releasing the clutch plate 75 for endwise and rotative movement. The clutch plate is provided with a projecting tooth or lug 85 which is now engaged by one of the teeth in the drive collar 76, effecting rotation of the clutch plate 75 and the disc member 74 forming with the drive pin 73 the drive element of the Geneva gear. The trip button 62 being released, when the clutch plate 75 completes a full turn, the engagement of the tip 77 thereof with the latch member 78 stops the rotation of the plate 75 and disengages the tooth 85 from the clutch collar 76.

The disc 72 of the Geneva gear is of the conventional type and is shown in FIG. 7 in an intermediate position with the drive pin or roller 73 nearing the end of the slot 86 in the disc 72, when the slots will be positioned as shown in FIG. 8. Any suitable intermittent drive mechanism may be employed, producing a precise, initial rotation of the driven member followed by a dwell during continuing rotation of the driving shaft. The drive shaft 71 carries a circular cam 87 at its lower end (see FIGS. 10 and 15) for the purpose of projecting the indexing pin 64 to its operative position during the period of dwell in the Geneva drive of the drive gear 63. A compression spring 88 between the indexing pin and the cam follower 89 insures proper seating of the pin as it is projected by the cam when there is misalignment or insufficient clearance for the end of the indexing pin.

As described, the drive mechanism first rotates the drive gear 63 through the Geneva gear and then actuates the indexing pin for final precise adjustment of the index plate 15. Preferably, however, the drive gear is connected to the Geneva gear through a variable-ratio drive, thus permitting a change in the angular adjustment of the index plate when desired by the operator (or the spacing between index points). As shown by way of example, a lever 91 (see FIGS. 1, 2, 10–12) is attached to the outer end of a shaft 92 extending through the front wall of the drive unit casing. A cam 93 on the inner end of the shaft raises and lowers a pivoted drive shaft 94 as the lever 91 is turned through an angle of 180 degrees. The shaft 94 shown in its lower and upper positions respectively in FIGS. 11 and 13, is keyed to the driven member 72 of the Geneva gear. In the upper position of the shaft 94, the member 72 drives the gear 63 at 1:1 ratio through gearing 96. When the lever 91 is turned to its alternate position, gearing 96 is disengaged (see FIG. 11), and the gear 63 is driven through a reduced angle during each cycle through gearing 95, shaft 96 and a pinion 97 meshing with drive gear 63. Either of the two angles of index adjustment may thus be easily selected by actuating the control lever 91.

In order to prevent "coasting" or overtravel of the index plate 15 when the drive gear 63 stops, a friction brake or the equivalent is employed. As shown in FIG. 1, the brake consists of a brake shoe 101 bearing on the rim of the index plate 15, the shoe 101 being attached to a leaf spring support 102. An adjustable screw 103 threaded into the frame may be used to vary the pressure of the brake shoe in order to obtain the desired frictional drag on the index plate. A pivoted lever 104 is provided for releasing the brake when desired, the shank portion 105 of said release lever being contiguous to the outer end of the leaf spring 102 and adapted to cam the brake shoe 101 away from the rim of the index plate as the lever 104 is twisted.

It will be apparent from the foregoing description that the invention provides an exact indexing mechanism based on a novel principle, and novel apparatus for testing potentiometers and the like employing such mechanism. The preferred construction described herein possesses outstanding advantages in respect to ease of operation and flexibility of the indexing function, including the phasing adjustment of the unit under test and a simple control for changing the angle or spacing of the index points. Obviously the index assembly may be utilized in other apparatus and variations in the structural details shown may be made within the spirit of the invention, including omission of one or more of the features described. In addition, while a motor drive and a manual cycling control button are convenient, the indexing mechanism may be rotated manually, or the cycling of the index plate may be effected automatically by an auxiliary programming or remote control system.

What is claimed is:
1. In an indexing mechanism, in combination,
 a rotatably supported index plate having a notched periphery,
 a member to be indexed attached to said index plate,
 positive driving means to advance said index plate from each index position to a predetermined angular position approximately to but not beyond the next desired index position, said positive driving means including a driving element having a positive driving engagement with said index plate until said index plate reaches said predetermined angular position,
 a movable, normally retracted index pin supported adjacent the periphery of the index plate, said index pin having a tip portion shaped to advance and lock the index plate in exactly the desired index position by engagement with the notch therein opposite the pin when the plate is advanced to said approximate angular position, and means for projecting said indexing pin into said notch.

2. In an indexing mechanism, in combination,
a rotatably supported index plate having equally spaced teeth around the circumference thereof,
a member to be indexed attached to said index plate,
a drive gear for rotating said index plate having teeth meshing with the teeth on said plate, the teeth on said index plate and gear being formed to provide at least a predetermined amount of backlash,
reversible motor means for driving said gear to advance said index plate in steps to angular positions short of the desired index positions, while maintaining a positive drive relation between said motor means and said index plate,
a reciprocable indexing member, and
means for actuating said reciprocable member to engage said plate teeth and effect fine adjustment of said index plate to the desired index positions, within the limits imposed by said gear tooth backlash, in both directions of rotation of the index plate.

3. In an indexing mechanism, in combination,
a rotatably supported index plate,
a member to be indexed attached to said index plate,
a drive gear for rotating said index plate, said gear having teeth shaped to provide a predetermined amount of backlash between the gear and plate,
means including said drive gear for cyclically turning said index plate through an angle slightly less than the angle between successive index positions,
means for subjecting said index plate to continuous frictional drag sufficient to prevent any further appreciable movement of the plate due to inertia after the drive through said gear is terminated, and
means for cyclically advancing said index plate and member from the gear-driven positions to the desired index positions.

4. An indexing mechanism according to claim 3, in which the axis of the drive gear remains fixed during the cyclic operation of the indexing means, the backlash between the gear and index plate permitting the final adjustment of the plate while the gear remains stationary.

5. Testing apparatus for a potentiometer provided with a control shaft and a contact slider connected to said shaft, comprising a rotatably supported index plate provided with toothed drive elements,
means for releasably clamping said control shaft to said index plate,
a drive unit including a drive gear meshing with the drive elements of said index plate,
pivotal supporting means for said drive unit concentric with the axis of said index plate, and
means for locking said supporting means in desired angular relation to said index plate.

6. In an indexing mechanism, in combination,
a rotatably supported index plate,
motor drive means for advancing said index plate step-by-step to desired index positions,
said motor drive means comprising a motor,
a drive gear for turning said index plate,
an indexing pin engaging said index plate to effect fine adjustment of the angular position thereof,
means including said motor for actuating said gear and pin in timed relation, and
supporting means for said motor drive means permitting angular adjustment thereof around the axis of said index plate.

7. In an indexing mechanism, in combination,
a rotatably supported index plate, and
motor drive means for said index plate,
said drive means including a motor,
coarse adjustment means actuated by said motor for advancing said index plate step-by-step to positions preceding the desired index positions and then invariably stopping said index plate in said positions, and
fine adjustment means including a cam member actuated by said motor for further advancing said index plate to the desired index positions.

8. In an indexing mechanism, in combination,
a rotatably supported index plate,
means including a drive gear for rotating said index plate to successive index positions,
said drive gear and index plate being each provided with salient teeth in driving relation, and
means for supporting the axis of said drive gear for predetermined adjustment around the axis of the index plate.

References Cited by the Examiner
UNITED STATES PATENTS

| | | | |
|---|---|---|---|
| 1,789,485 | 1/1931 | Wren | 74—820 X |
| 2,188,996 | 2/1940 | Carlsen | 74—820 |
| 2,804,594 | 8/1957 | Bjong et al. | 73—1 X |
| 2,811,692 | 10/1957 | Ebbs et al. | 73—1 X |
| 2,934,977 | 5/1960 | Wildhaber | 74—822 |
| 3,102,413 | 9/1963 | Serdahely | 73—1 |

FOREIGN PATENTS 217,796   1/1910   Germany.

ISAAC LISANN, *Primary Examiner.*

SAMUEL S. MATTHEWS, *Assistant Examiner.*